United States Patent
Lembach et al.

(10) Patent No.: US 8,657,082 B2
(45) Date of Patent: Feb. 25, 2014

(54) BRAKE DISC FOR A VEHICLE AND METHOD FOR THE PRODUCTION THEREOF

(75) Inventors: Oliver Lembach, Sindelfingen (DE); Ralph Mayer, Boeblingen (DE)

(73) Assignee: Daimler AG, Stuttgart (DE)

( * ) Notice: Subject to any disclaimer, the term of this patent is extended or adjusted under 35 U.S.C. 154(b) by 243 days.

(21) Appl. No.: 13/145,583

(22) PCT Filed: Jan. 27, 2010

(86) PCT No.: PCT/EP2010/000482
§ 371 (c)(1),
(2), (4) Date: Jul. 21, 2011

(87) PCT Pub. No.: WO2010/089047
PCT Pub. Date: Aug. 12, 2010

(65) Prior Publication Data
US 2011/0278116 A1    Nov. 17, 2011

(30) Foreign Application Priority Data
Feb. 9, 2009  (DE) .......................... 10 2009 008 105

(51) Int. Cl.
*F16D 69/00*    (2006.01)
(52) U.S. Cl.
USPC ................................ 188/251 M; 188/218 XL
(58) Field of Classification Search
USPC ..... 188/251 A, 251 M, 218 L, 17, 18 A, 18 R
See application file for complete search history.

(56) References Cited

U.S. PATENT DOCUMENTS

| | | | |
|---|---|---|---|
| 4,542,111 A | 9/1985 | Buran et al. | |
| 4,715,486 A | 12/1987 | Burgdorf et al. | |
| 5,931,269 A * | 8/1999 | Detwiler et al. | 188/18 A |
| 8,028,812 B2 * | 10/2011 | Martino | 188/218 XL |
| 2007/0144839 A1 | 6/2007 | Seksaria et al. | |
| 2008/0131621 A1 | 6/2008 | Lineton et al. | |
| 2008/0196986 A1 * | 8/2008 | Meckel | 188/218 XL |

FOREIGN PATENT DOCUMENTS

| | | |
|---|---|---|
| CN | 1671878 A | 9/2005 |
| DE | 10203507 A1 | 1/2003 |
| DE | 10345000 B3 | 1/2005 |
| DE | 10342743 A1 | 4/2005 |
| DE | 102004016098 A1 | 10/2005 |
| DE | 102005008569 A1 | 10/2006 |
| GB | 2083146 A | 3/1982 |
| JP | 57076335 A | 5/1982 |
| JP | 2004-300528 A | 10/2004 |
| JP | 2004300528 A | 10/2004 |
| WO | 2008070329 A1 | 6/2008 |
| WO | 2008074030 A1 | 6/2008 |

* cited by examiner

*Primary Examiner* — Melanie Torres Williams
(74) *Attorney, Agent, or Firm* — Patent Central LLC; Stephan A. Pendorf

(57) ABSTRACT

The invention relates to a brake disc (BS) for a vehicle, comprising a main body (G) that is made of a metal material, particularly gray cast iron, which has friction surfaces (R) having a coating (B) made of a hard material.
According to the invention, the coating (B) is formed from carbides, ceramics, cermet or metals.

3 Claims, 1 Drawing Sheet

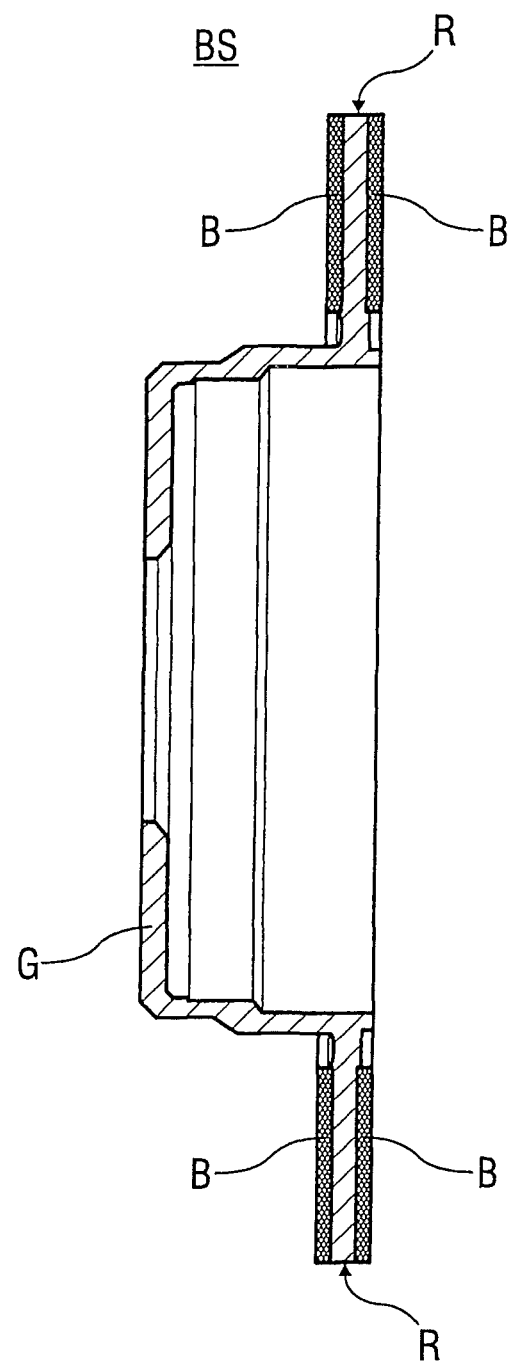

BRAKE DISC FOR A VEHICLE AND METHOD FOR THE PRODUCTION THEREOF

The invention relates to a brake disc for a vehicle according to the characteristics of the preamble of claim 1. The invention further relates to a method for the production of a brake disc according to the characteristics of the preamble of claim 14.

From the state of the art is known, as described in DE 10 2004 016 098 A1, a brake disc for a vehicle and a method for producing a brake disc. The brake disc has at least one main body, which carries a wear-resistant layer at least partially in the region of its outer surfaces, which layer serves as a friction layer, wherein at least one intermediate layer is applied as an adhesion-conveying layer and/or as a corrosion protection layer between the main body and at least one outer wear-resistant layer and this at least one intermediate layer is applied in a galvanic manner.

In DE 10 2005 008 569 A1 is described a friction element and a method for its production. In this method, a friction element main body is provided and a coating is applied. The coating has a melting alloy and is melted on.

From DE 102 03 507 A 1 is known a brake disc for a vehicle and a method for its production. The brake disc comprises a main body of a metal material, particularly gray cast iron, which has at least one friction surface with a coating of a hard material with a high friction coefficient. The main body is turned around the layer thickness in the direction that is axis-parallel to the axis of the brake disc. The coating consists for example of aluminum oxide, diamond or a ceramic material.

In DE 103 42 743 A1 is described a brake disc for a vehicle and a method for its production. The brake disc comprises a main body, which carries a wear-resistant layer at least in the region of the outer surface, which serves as a friction layer and a region of a material for the adhesion-conveyance between the main body and the at least one wear-resistant outer layer, wherein the region of the material for the adhesion-conveyance and the wear-resistant outer layer is formed as at least one gradient layer, whose composition changes in the layer thickness direction.

From DE 103 45 000 B3 is known a device and a method for producing brake parts. With the method for producing brake parts, a wear protection layer is provided for its annular brake surface, which wear protection layer is formed by the surface-side melting on of the carrier material and mixing of coating material with the melt and is introduced into the carrier material, wherein the energy entry for the surface-side melting on of the carrier material takes place by light waves, arcs, plasma and/or electron beam, and particularly preferred by a laser, effects the surface to be melted on as radiation energy.

The invention is based on the object to provide an improved method for producing a brake disc for a vehicle.

The object is solved according to the invention by a method for producing a brake disc for a vehicle with the characteristics of claim 1. Regarding the method, the object is solved by the characteristics given in claim 14.

Preferred arrangements and further developments of the invention are given in the dependent claims.

The brake disc for a vehicle according to the invention comprises a main body of a metal material, particularly gray cast iron, steel or aluminum alloy, which has friction surfaces with a coating of a hard, wear-resistant material. The coating has hard materials in the form of carbides, or oxide ceramics.

The hard materials of carbides or oxide ceramics considerably contribute to an improved wear-resistance and good and constant friction coefficients. The carbides or the oxide ceramics are thereby present as bound by a binder phase or a matrix, which are particularly formed by alloys on the basis of Cr, Ni and/or Fe. Particularly Cr and/or Cr/Ni steels are among these.

By means of the solution according to the invention, a cost-efficient brake disc can be produced, as a large part of the brake disc consists of cost-efficient gray cast iron. By means of the coating, the brake disc has however a largely lower wear that a brake disc where the friction surfaces are also formed of gray cast iron. Furthermore, a weight reduction and a corrosion reduction can be achieved by means of this coating.

The solution according to the invention enables an even friction coefficient of the brake disc and a reduction of temperatures occurring during braking, whereby a so-called brake fading, that is, a failure of the brake due to overheating can be avoided. By means of a reduction of vibrations and noises during braking, a comfort increase can additionally be achieved. By means of the solution according to the invention, elaborate reworkings for a surface hardening are omitted during a manufacture.

Embodiments of the invention are explained in more detail by means of a drawing.

It shows thereby:

FIG. 1 a longitudinal section through a brake disc according to the invention.

FIG. 1 shows a longitudinal section through a first embodiment of a brake disc BS according to the invention. The brake disc BS is formed of a main body G of a metal material, for example of gray cast iron. Steel or a light metal alloy as for example aluminum can also be used as further materials. The friction surfaces R of the brake disc BS have a coating B of a hard material, which acts as a wear protection material. This coating B comprises carbides and/or oxide ceramics as hard materials. These coatings can also belong to the material classes of cermets or metal alloys.

In a first arrangement of the coating, carbides of tungsten and/or of chromium are incorporated in a metallic matrix of nickel, cobalt and/or chromium.

The part of WC is hereby preferably in the region of 60-85%. (Weight percent are always meant to be understood with the statement %, unless stated otherwise.)

The metallic matrix essentially has the object of the binding of the enclosed carbides. The part of the metallic matrix is preferably in the range of 10 to 50%, particularly preferred in the range of 15 to 25%.

Thereby, alloy compositions with a high Co content are of particular importance for the metallic matrix, so that particularly parts of 8-15% Co, 2 to 6% Cr and 0.001 to 3% Ni and possibly traces of further metals result for the coating.

Typical preferred coating compositions are:
70-85% WC,
7-12% Co 10,
3-5% Cr,
0.5-2% Ni, and contaminants
or
75-85% WC,
7-12% Co 10,
3-5% Cr,
0.001 to 1 Ni, and contaminants.

A further embodiment of the coating B of carbides is WCCoCrNi, formed with a part of about 80 weight percent, cobalt, preferably with a part of about 10 weight percent, chromium, preferably with a part of about 1 weight percent.

The Cr can also be present in these coating compositions as partially also bound as carbide.

A further well-suited metallic matrix is coined by a high Ni content. WC and $Cr_3C_2$ occur as hard materials as essential components of these components, which together result as a part of 70 to 95% of the coating.

Typical preferred coating compositions are:
65-85% WC
15-30% $Cr_3C_2$
5-12% Ni, and contaminants,
or
70-75% WC,
18-22% $Cr_3C_2$,
5-8% Ni, and contaminants.

A coating B of carbides is for example $WCCr_3C_2Ni$, preferably formed with a part of about 73 weight percent, chromium carbide, preferably with a part of about 20 weight percent and nickel, preferably with a part of about 7 weight percent A further coating with carbides is formed of a chromium steel. Here, Cr carbides essentially occur as hard materials. The preferred steels have a chromium part of 12 to 22 weight percent. 15-20% Cr are preferred.

A further coating B is formed of oxide ceramics, for example of titanium oxide ($TiO_2$) and aluminum oxide ($Al_2O_3$). The aluminum oxide part is preferably between 60 weight percent and 97 weight percent and titanium oxide ($TiO_2$), preferably with a part between 3 weight percent and 40 weight percent. Compositions with 50-60% of $Al_2O_3$ and 40-50% of $TiO_2$ are particularly preferred.

A further coating is a compound material of oxide ceramics in a metal matrix, often also called cermet. Stainless steel is particularly suitable as metallic matrix. Particularly suitable stainless steels are Cr/Ni steels, particularly 316L or 1.4404. The ceramics is preferably contained with a part of 50-80, preferably 65 to 75 weight percent, and the intermetallic matrix preferably with a part of 20-50%, preferably 25-35 weight percent. The ceramics preferably consists of aluminum oxide ($Al_2O_3$) with titanium oxide ($TiO_2$). The aluminum oxide part in the ceramics is preferably between 60 weight percent and 97 weight percent and titanium oxide ($TiO_2$) preferably with a part between 3 weight percent and 40 weight percent. Compositions with 50-60% $Al_2O_3$ and 40-50% $TiO_2$ are particularly preferred.

By means of a pre-treatment of the main body G of the brake disc BS prior to applying the coating B, for example by grinding the friction surfaces R, an optimum coating B and an optimum hold of the coating B can be achieved on the main body G.

High speed flame spraying, plasma spraying, cold gas spraying or arc wire spraying can preferably be used as coating methods. The high speed flame spraying is particularly suitable for generating the coating B of carbides. The plasma spraying is suitable for generating the coating B of ceramics, cermet or metal. The cold gas spraying and the arc wire spraying are also suitable for generating the coating B of metal.

With the plasma spraying, a plasma is generated by an arc and a plasma gas flowing through this arc. In a plasma gas flow forming thereby, the coating material is introduced in powder form, which is melted on by the plasma and is sprayed onto the friction surfaces R to be coated by means of the plasma gas flow.

With the cold gas spraying, the coating material is sprayed on in powder form onto the friction surfaces R with a very high speed. A relatively low heated process gas is accelerated to supersonic speed for this by expansion in a laval nozzle, whereby a gas beam forms. The coating material is injected into this gas beam. The powdery coating material is thereby accelerated to a speed which is so high that it forms a tight and a rigidly adhering layer when impinging the friction surfaces R to be coated, also without a melting on beforehand, in contrast to other thermal spray methods.

With the arc spraying, the coating material is melted on in the shape of a wire by means of an arc. Spray particles forming thereby are sprayed onto the friction surfaces R to be coated by means of an atomizer gas.

The coating B can further for example also be applied by means of a laser beam, electron beam or induction, wherein the coating material is applied to the friction surface to be coated for example in powder form and is melted on by means of a laser beam, electron beam or induction.

By means of a variation of method parameters of the mentioned coating methods, the coating B can be optimized, so that a coating B adhering optimally on the main body G with optimum properties can be achieved, that is, a wear- and corrosion-resistant coating B with an optimum noise, vibration and temperature behavior.

List of Reference Numerals

BS Brake disc
B Coating
G Main body
R Friction surface

The invention claimed is:

1. A brake disc (BS) for a vehicle, comprising a main body (G) of a metal material, which has friction surfaces (R) with a coating (B) of a hard material, which comprises oxide ceramics,
    wherein the coating is a compound material of oxide ceramics and metal matrix with a ratio of 50-80% to 20-50%, and wherein the ceramics is $Al_2O_3$ and $TiO_2$, with a ratio of 60-97% to 3-40%, and the metal matrix is Cr/Ni steel.

2. The brake disc (BS) according to claim 1, wherein the coating (B) is applied to friction surfaces (R) of a main body (G) of a metal material by means of high speed flame spraying, plasma spraying, cold gas spraying or arc wire spraying.

3. The brake disc (BS) according to claim 1, wherein the metal material is gray cast iron.

* * * * *